Patented Apr. 6, 1954

2,674,642

UNITED STATES PATENT OFFICE 2,674,642

STORAGE BATTERY ACTIVE MATERIAL

Bernard Agruss, East Orange, N. J., and Frank Bernard Finan, Hicksville, N. Y., assignors to National Lead Company, New York, N. Y., a corporation of New Jersey No Drawing. Application December 24, 1953, Serial No. 400,352

15 Claims. (Cl. 136—26)

1

This invention relates to the manufacture of lead-acid storage batteries and to a novel active material for the plates of such batteries and this application is a continuation-in-part of co-pending application, Serial Number 325,894, filed December 13, 1952.

Present methods for manufacturing lead-acid storage batteries comprise pasting grid structures with a mixture of lead oxide, for instance litharge, which may contain metallic lead, read lead and other additives, and sulfuric acid. The mixture of litharge and acid forms a plastic paste which can be pressed into the interstices of the grid structure and which on drying forms a hard cohesive, cemented material which is readily retained in the grid. This plastic paste is a result of the chemical action between the litharge and sulfuric acid wherein a considerable proportion of lead sulfate is formed. Such a paste is characterized by having desirable properties with respect to density, consistency and adhesiveness, all of which are necessary for successful grid pasting operations. Generally, the use of sulfuric acid in the paste preparation may be said to be the universal practice in the industry.

The functions of the sulfuric acid and the lead sulfate in the paste mixture appear to be a bulking of the paste mass thereby considerably lowering its density, thickening the mixture so that its consistency is of desirable plasticity, and substantially increasing the adhesiveness of the paste. Such a paste will have a density of about 70 grams per cubic inch.

It has long been desired in the art to avoid the use of sulfuric acid and lead sulfate in the paste-making operations. Heretofore, such attempts have been generally ineffective and none are known to have achieved any noticeable degree of commercial acceptance. Sulfuric acid has been objected to principally because of its well known corrosive effect on equipment. There are other serious objections to the use of sulfuric acid in paste manufacture. It creates considerable heat in the paste mixture which often affects the characteristics of the paste. In addition, a sulfate paste irreversibly sets up or hardens in a short time and the paste condition cannot be regenerated. Also there has always been a desire for simpler, quicker and more economical methods of paste manufacture. Lead sulfate has been used in the active material to a limited extent, but it is objected to for the reasons that it imparts characteristics to the paste that are generally inferior to those obtained with the use of sulfuric acid. The employment of lead sulfate is not economically attractive as against sulfuric acid and it introduces new problems of incorporation and homogeneous distribution.

The principal object of this invention is to provide a novel active material for lead-acid storage battery plates. Another object is to provide an active material which is more amenable to control of physical characteristics than active material heretofore employed. A further object is to provide an improved method for the manufacture of lead-acid storage batteries. A still further object is to provide an active material of relatively low density characterized by having good cohesive properties and widely controllable paste consistencies. Still another object is to provide an active material adapted for a one-fill formation process in lead-acid storage battery manufacture. These and other objects will become apparent from the following description of the present invention:

Broadly, this invention contemplates the provision of an active material comprising lead oxide containing in intimate admixture therewith an effective minor amount, preferably a small proportion of a hydrophilic substance. By the term "effective minor amount" as used herein is meant an amount above about 0.05% up to but less than 50% of the total weight of the mixture. The effective amount of hydrophilic substance to be present in the active material in admixture with lead oxide should be such that said active material will be capable of taking up between about 65 ml. and 300 ml., and preferably between about 90 ml. and 150 ml. of water per pound to form a plastic, adhesive paste having a density of between about 80 and 40, and preferably between 62 and 55 grams per cubic inch which will be suitable for pressing into the interstices of a storage battery grid structure. In general, the effective amount of the hydrophilic substance necessary to produce such pastes will not exceed about 20% by weight of the mixture. More frequently, the effective amount will be found to be between about 0.05% and 5.0%, and preferably between 0.1% and 2.0%.

The hydrophilic substances useful in this invention are those having a very high water sorption factor. The term sorption is understood to include all the water-attractive forces occurring in these substances whether they be physical or chemical in nature. This property may be concretely expressed on the basis of the weight of water taken up or "sorbed" per unit weight of the hydrophilic material.

These hydrophilic substances are characterized by their ability to retain large amounts of water in proportion to their own weight or mass. They take up the water in such a manner that the water loses its fluid nature and becomes part of a plastic or semi-rigid structure. Water in such a condition may be referred to as structural water.

In our invention, this "structure" of water and hydrophilic substance serves most importantly as a bulking agent. It may be helpful to visualize this as a plastic structure of a hydrophilic substance and water having lead oxide dispersed therethrough. This structure holds the necessary lead oxide in a cohesive mass yet at the same time maintains the oxide particles sufficiently apart to keep the density of the whole relatively low. Heretofore the necessary bulking was imparted by sulfuric acid or lead sulfate. In our discovery the hydrophilic substance and water perform substantially the same function. In effect, we have replaced lead sulfate in the paste composition with a very economical bulking material consisting predominantly of water. Other important advantages of this invention are set forth in the appended examples.

There are a considerable number of hydrophilic substances known. Many of these are not satisfactory for the purpose of this invention. We have found that only those substances having a high order of sorption or the ability to take up very large amounts of water are suitable in active material compositions. The hydrophilic substances suitable for use in storage battery manufacture are characterized by having a water sorption capacity of at least 20 grams of water per gram of hydrophilic substance. This water sorption capacity may be defined as the maximum amount of water which can be added to one gram of the hydrophilic material and which will be retained by the material forming a semi-rigid body possessing gel characteristics. Substances having a water sorption capacity of less than about 20 grams per gram are not suitable for the purpose of this invention for the reason that they do not retain sufficient water to provide proper plasticity to the lead oxide material.

Among the hydrophilic substances found to be suitable in storage battery active materials and paste manufacture are the following: hydrogelling cellulose derivatives, particularly the ethers of cellulose such as the lower alkyl-, hydroxyalkyl-, and carboxyalkyl-ethers for instance sodium carboxymethyl cellulose, carboxymethyl hydroxyethyl cellulose, methyl cellulose and hydroxyethyl cellulose; inorganic compounds such as sodium bentonite, and starch derivatives such as a low substituted starch acid-ester derivative containing carboxylic and sulfuric acid groups.

The water sorption capacities of the hydrophilic substances preferred in the practice of this invention are shown in the following table:

*Table I*

Water sorption capacity (grams of water per gram of substances)

| | |
|---|---|
| Sodium carboxymethyl cellulose | 45 |
| Carboxymethyl hydroxyethyl cellulose | 40 |
| Methyl cellulose | 35 |
| Hydroxyethyl cellulose | 30 |
| Sodium bentonite | 20 |
| Starch derivative | 20 |

We prefer to dry mix intimately the hydrophilic substance with the lead oxide to make the active material composition. Any conventional mixing apparatus is suitable for this purpose. It is not necessary, however, to follow this preferred method. The hydrophilic substance may be incorporated into a suitable amount of water and the lead oxide added thereto or alternatively, the lead oxide and water may be mixed into a slurry and the hydrophilic substance blended into this slurry.

The lead oxide employed and as the term is herein used, is generally litharge containing appreciable amounts often up to 30 or 50% of finely-divided metallic lead. This lead oxide may consist entirely of litharge or of litharge containing some red lead, expander materials and other oxides of lead as will be appreciated by those skilled in the art.

Before giving specific embodiments of this invention, a discussion of the terms used in describing active material pastes might be helpful. Such pastes will generally be described in terms of "cube weight" or "density" and paste consistency.

The "cube weight" or "density" of an active material paste is taken by packing a four cubic inch container with the paste material and weighing the contents. The cube weight is reported in grams per cubic inch. Prior art active material pastes as currently employed will generally be from 65 to 72 grams per cubic inch in density.

The consistency is measured by a penetrometer and the results are empirical. The penetrometer used as a bob, shaft and weights totalling 240 grams. The bob is two inches long, and one-half ($\frac{1}{2}$) inch in diameter. The lower three-quarters of an inch of the bob is tapered to a blunt end three thirty-seconds ($\frac{3}{32}$) of an inch in diameter. The lower end of the bob is suspended 3.1 millimeters above the paste sample and the bob is released. The depth of penetration is reported in millimeters.

A consistency reading of 8 (8 millimeters penetration) indicates a paste consistency roughly equivalent to the stiff paste consistency generally employed in commercial grid pasting machines. A reading of 12 indicates a paste consistency roughly equivalent to a paste consistency employed in machines utilizing softer pastes. A reading of 20 indicates a paste consistency equivalent to the paste consistency employed when hand pasting the grids.

The following examples clearly describe and illustrate the practice of this invention. In these examples, visual determination of the percentage of active material area covered with a white lead sulfate was taken as an indication of the degree of formation. A fully formed positive plate has a surface area showing no evidence of the presence of lead sulfate.

EXAMPLE

For positive plates, six pounds of litharge containing about 30% finely divided metallic lead and 0.4% by weight of the sodium salt of carboxymethyl cellulose were intimately dry mixed. This composition was placed in a mixer and 480 ml. of water added, i. e. 80 ml. per lb., and the mixture blended for five minutes to produce the active material paste. This paste had a density of 65.7 grams per cubic inch and a consistency of 9.6. This was pasted into grid structures and dried to make up unformed positive plates.

For negative plates, six pounds of similar litharge, 2% by weight of a conventional negative expander consisting of carbon black, barium sulfate and an organic lignin derivative, and 0.4% by weight of the sodium salt of carboxymethyl cellulose were intimately dry mixed. 420 ml. of water, i. e. 70 ml. per lb., was added to this composition and the mixture blended for five minutes. The resulting paste had a density of 71.2 grams per cubic inch and a consistency of 14.

This paste was applied to grid structures and dried to make up unformed negative plates.

These positive and negative plates were assembled with insulating separators into cell containers to constitute an SAE Group I, 15-plate, 100 ampere hour battery.

The cells of this battery were filled with sulfuric acid of 1.320 specific gravity and the battery charged at 13 amperes for 30 hours. The battery was then disassembled and examined. The surface of the active material in the positive plates was completely cleared of lead sulfate, indicating complete formation of the positive plates. The acid electrolyte had a final specific gravity of 1.270. An electrolyte strength of about 1.270 sp. gr. is generally preferred for the optimum in performance and life of a lead-acid storage battery.

This battery was reassembled and tested for performance and life according to the standard SAE tests. The initial capacity was equivalent to that generally obtained from commercial, nominal 100 ampere hour batteries. On life it sustained 447 cycles.

In comparison, a standard SAE Group I battery was prepared according to conventional methods employing a litharge-sulfuric acid paste without sodium carboxymethyl cellulose. The positive paste had a density of 63.5 and the negative paste a density of 69. The assembled battery was filled with sulfuric acid of 1.324 specific gravity and charged at 15 amperes for 40 hours. Upon examination, the positive plates surfaces were covered with about 40% lead sulfate indicating incomplete formation. The higher rate and longer time of charge used on the standard should have produced more rapid and complete formation. This comparison illustrates the remarkable formation ability of applicant's active material composition.

For further comparison, conventional standard SAE Group I batteries employing conventional litharge-acid pastes of 64 density for the positive plates and 72 density for the negative plates and employing conventional two step charging procedures, i. e. charging at 13 amperes for 24 hours in 1.080 specific gravity acid followed by a conditioning charge at 5 to 6 amperes for 16 hours in 1.380 specific gravity electrolyte will result in a battery having a final specific gravity of 1.280, a capacity of 100 ampere-hours and an average life of 400 cycles.

This example illustrates the excellent bulking properties of our novel active material notwithstanding the elimination of lead sulfate and sulfuric acid in the paste composition. It also illustrates the substantially improved life of batteries employing this active material in their plates and the simple and economical one-fill formation process of manufacture. The one-fill formation feature of this invention eliminates the double filling and double charging steps generally employed in conventional lead-acid storage battery manufacture.

We have found it preferable to employ the sodium salt of carboxy methyl cellulose in concentrations of 0.4% to 0.7% of the total weight of the mixture. The following table lists numerous active material compositions and their properties according to the practice of this invention. It should be noted that the employment of different percentages of hydrophilic substances and the addition of varying amounts of water is productive of a very wide range of paste densities and consistencies.

Table II

| Active material compositions consisting of lead oxide and the following percentages of hydrophilic substances | ml. H₂O/lb. | Paste Characteristics | | Time of mixing, min. | Battery Performance | |
|---|---|---|---|---|---|---|
| | | Gram weight | Consistency | | Formation and time | Life cycles |
| 1. Sodium carboxymethyl cellulose, 0.4% | 100 | 61.0 | 22 | 8 | 100% in 30 hrs | |
| 2. Sodium carboxymethyl cellulose, 0.4% | 80 | 65.2 | 10 | | 90% in 42 hrs | 548 |
| 3. Sodium carboxymethyl cellulose, 0.7% | 100 | 60.0 | 7.6 | 8 | 100% in 30 hrs | |
| 4. Sodium carboxymethyl cellulose, 1% | 100 | 53.5 | 4.2 | 8 | 90% in 40 hrs | |
| 5. Methyl cellulose, 2% | 85 | 62.0 | 9 | 8 | 100% in 36 hrs | 513 |
| 6. Sodium bentonite, 2% | 80 | 66.5 | 20 | 3 | 60% in 40 hrs | |
| 7. Sodium salt of an ungelatinized low substituted starch acid-ester derivative containing carboxylic and sulfuric acid groups, 2%. | 80 | 65.0 | 18 | 3 | 40% in 40 hrs | |
| 8. Sodium carboxymethyl cellulose, 0.4% [1] | | | | | 100% in 24 hrs | 698 |

[1] This example was the only one formed according to conventional two-step formation procedures.

The active material compositions of this invention have another advantage in that they exhibit to a more or less degree thixotropic properties. The paste consistencies of applicants' composition may be varied by the time of mixing. For example, a composition of Barton litharge containing 0.4% sodium carboxymethyl cellulose was made into a paste by adding 100 ml. of water per pound of the composition. This paste had the following consistencies according to the duration of mixing time:

| Time of mixing | 3 min. | 4 min. | 5 min. | 6 min. | 8 min. |
|---|---|---|---|---|---|
| Consistency | 13 | 17 | 18 | 20 | 21 |

Furthermore, such a paste having partially stiffened on standing, may be reworked and softened to a desirable consistency.

The foregoing example illustrates selected embodiments of this invention. The novel active material of this invention makes possible the manufacture of storage batteries having substantially increased life, and initial capacities generally equivalent to that of prior art batteries. The new bulking principle employed in these novel active materials permits the manufacture of lighter active material pastes resulting in a substantial economy in lead content. No heat is generated during the mixing of these active materials and the difficulty of premature, irreversible stiffening of the paste associated with sulfuric acid pastes is no longer of consequence. Active material pastes, according to this invention, may be accurately controlled over a wide range of paste characteristics and in the event of a mixing accident or error the desirable density and consistency may be obtained by adjusting any one or all of the variables, namely, hydrophilic substance, water and time of mixing. A one-fill plate formation is also made possible by the use of our novel active material, thus eliminating the dumping, refilling and conditioning charge generally employed in prior art methods of manufacture. Pastes prepared from the active materials of the present invention are useful for the preparation of both negative and positive storage battery pastes. However, the adhesion and consistency characteristics may be different as between the negative and positive plates when the same amount of hydrophilic substance is employed. This is due to the presence in the negative plate of a wetting agent of the organic lignin type which tends to counteract the effect of the hydrophilic substance.

In the storage battery industry some manufacturers may prefer to blend the hydrophilic substance with lead oxide of their own manufacture or with lead oxide purchased by them in bulk. According to a practical embodiment of the present invention, there is first prepared a mixture of lead oxide concentrated with respect to the hydrophilic substance, containing a relatively large amount of the latter, up to 50% and more, but preferably between 10% and 20%. Such mixtures may be stored and shipped. When it is desired to prepare a storage battery active material from such concentrated mixtures, it is only necessary to add additional lead oxide in an amount sufficient to reduce the content of the hydrophilic substance to what has been defined above as an effective minor amount. Thus, the invention contemplates the provision of an intermediate composition or concentrate of the hydrophilic substance with lead oxide which is capable upon admixture with additional lead oxide of forming the storage battery active materials of the invention.

The foregoing description and examples of our invention have been given for purposes of illustration, and no undue limitations should be deduced therefrom. It is obvious that variations within the skill of the art may be made without departing from the spirit of the invention.

We claim:

1. Active material for lead-acid storage batteries comprising an intimate mixture of lead oxide and an effective amount between about 0.05% and about 20.0% by weight of a hydrophilic substance characterized by a water sorption capacity of at least 20 grams of water per gram of hydrophilic substance, said amount of hydrophilic substance being effective to produce plastic, adhesive active material paste when mixed with water in proportion of 65 ml. to 300 ml. of water per pound of mixture.

2. Active material for lead-acid storage batteries comprising an intimate mixture of lead oxide and an effective amount between about 0.05% and about 20.0% by weight of a hydrophilic substance characterized by a water sorption capacity of at least 20 grams of water per gram of hydrophilic substance, said mixture being capable of forming plastic, adhesive paste suitable for pressing into the interstices of a storage battery grid structure when mixed with water in proportion of 65 ml. to 300 ml. of water per pound of mixture.

3. Active material for lead-acid storage batteries comprising an intimate mixture of lead oxide and about 0.05% to about 5.0% by weight, of a hydrophilic substance characterized by a water sorption capacity of at least 20 grams of water per gram of hydrophilic substance.

4. Active material for lead-acid storage batteries comprising an intimate mixture of lead oxide and about 0.1% to about 2.0% by weight, of a hydrophilic substance characterized by a water sorption capacity of at least 20 grams of water per gram of hydrophilic substance.

5. Active material for lead-acid storage batteries comprising an intimate mixture of lead oxide and about 0.05% to about 5.0% by weight of a hydrophilic cellulose derivative selected from the group consisting of lower alkyl-, hydroxy alkyl-, and carboxyalkyl ethers of cellulose.

6. Composition of matter according to claim 5 in which the hydrophilic cellulose derivative is sodium carboxy methyl cellulose.

7. Composition of matter according to claim 5 in which the hydrophilic cellulose derivative is carboxy methyl hydroxyethyl cellulose.

8. Composition of matter according to claim 5 in which the hydrophilic cellulose derivative is methyl cellulose.

9. Composition of matter according to claim 5 in which the hydrophilic cellulose derivative is hydroxyethyl cellulose.

10. As a new composition of matter, a plastic, adhesive paste suitable for pressing into the interstices of a storage battery grid structure comprising an intimate mixture of lead oxide and an effective amount of a hydrophilic substance characterized by a water sorption capacity of at least 20 grams of water per gram of hydrophilic substance between about 0.05% and 20.0% of the combined weight of lead oxide and hydrophilic substance, and water in proportion of 65 ml. to 300 ml. per pound of mixture of lead oxide and hydrophilic substance.

11. As a new composition of matter, a plastic adhesive paste suitable for pressing into the interstices of a storage battery grid structure comprising an intimate mixture of lead oxide with an amount of a hydrophilic substance characterized by a water sorption capacity of at least 20 grams of water per gram of hydrophilic substance between about 0.1% and 5.0% of the combined weight of lead oxide and hydrophilic substance and water in proportion of 65 ml. to 300 ml. per pound of mixture of lead oxide and hydrophilic substance.

12. Composition of matter according to claim 11 in which the hydrophilic cellulose derivative is sodium carboxy methyl cellulose.

13. Composition of matter according to claim 11 in which the hydrophilic cellulose derivative is carboxy methyl hydroxyethyl cellulose.

14. Composition of matter according to claim 11 in which the hydrophilic cellulose derivative is methyl cellulose.

15. Composition of matter according to claim 11 in which the hydrophilic cellulose derivative is hydroxyethyl cellulose.

References Cited in the file of this patent

UNITED STATES PATENTS

| Number | Name | Date |
| --- | --- | --- |
| 1,963,468 | Kranzlein et al. | June 19, 1934 |
| 2,365,600 | Schorger | Dec. 19, 1944 |